US012566886B2

(12) United States Patent
Jiang et al.

(10) Patent No.: US 12,566,886 B2
(45) Date of Patent: Mar. 3, 2026

(54) DYNAMIC PROGRAMMING SOLUTION FOR PRIVACY PROTECTION EVALUATION

(71) Applicant: Lemon Inc., Grand Cayman (KY)

(72) Inventors: Bo Jiang, Culver City, CA (US); Jian Du, Culver City, CA (US); Qiang Yan, Beijing (CN)

(*) Notice: Subject to any disclaimer, the term of this patent is extended or adjusted under 35 U.S.C. 154(b) by 190 days.

(21) Appl. No.: 18/363,249

(22) Filed: Aug. 1, 2023

(65) Prior Publication Data

US 2025/0045450 A1    Feb. 6, 2025

(51) Int. Cl.
*G06F 21/62* (2013.01)

(52) U.S. Cl.
CPC ................................. *G06F 21/6245* (2013.01)

(58) Field of Classification Search
CPC ...... G06F 21/60; G06F 21/62; G06F 21/6218; G06F 21/6245
See application file for complete search history.

(56) References Cited

U.S. PATENT DOCUMENTS

| | | | | |
|---|---|---|---|---|
| 10,635,824 | B1 * | 4/2020 | Triandopoulos ...... | G06F 21/602 |
| 2022/0255764 | A1 * | 8/2022 | Li ......................... | G06F 21/606 |
| 2023/0401331 | A1 * | 12/2023 | Xu ...................... | G06F 21/6254 |

OTHER PUBLICATIONS

Guo et al., "Birds of a Feather Flock Together:How Set Bias Helps to Deanonymize You via Revealed Intersection Sizes", 31st USENIX Security Symposium. Aug. 10-12, 2022 • Boston, MA, USA, https://www.usenix.org/conference/usenixsecurity22/presentation/guo.

* cited by examiner

*Primary Examiner* — D'Arcy Winston Straub
(74) *Attorney, Agent, or Firm* — Fish & Richardson P.C.

(57) ABSTRACT

Methods and systems for evaluating privacy protection are provided. A method includes generating a first intersection of a first dataset and a second dataset. The method also includes determining a partition number based on the first dataset, the first intersection, and a number of iterations by: determining a privacy leakage for subsets of the first dataset based on the first dataset, the first intersection, and the number of iterations; and determining the partition number based on the privacy leakage for each of the subsets of the first dataset. The method further includes partitioning the first dataset into a first sub-dataset and a second sub-dataset using the partition number, and determining positive membership and negative membership for elements of the first sub-dataset in the second dataset and for elements of the second sub-dataset in the second dataset.

20 Claims, 6 Drawing Sheets

200

201

DYNAMIC PROGRAMMING SOLUTION FOR PRIVACY PROTECTION EVALUATION

FIELD

The embodiments described herein pertain generally to evaluating the effectiveness of a privacy protection protocol or algorithm. More specifically, the embodiments described herein pertain to a dynamic programming solution for evaluating the effectiveness of a privacy protection protocol or algorithm.

BACKGROUND

Private set intersection (PSI) is one of secure two- or multi-party protocols or algorithms by which intersection-related statistics are computed, and PSI has garnered significant industry interest. PSI algorithms or protocols permit two or more organizations to jointly compute a function (e.g., count, sum, etc.) over the intersection of their respective data sets without revealing to other party the intersection explicitly. In an application, two parties may be unwilling or unable to reveal the underlying data to each other, but they may still want to compute an aggregate population-level measurement. The two parties may want to do so while ensuring that the input data sets reveal nothing beyond these aggregate values about individual users. It is to be understood that a protocol or algorithm that discloses the size, count, or cardinality of the intersection of the data sets of two parties to one or both of the two parties may be referred to as an intersection-size-revealing protocol or algorithm.

SUMMARY

Features in the embodiments disclosed herein provide a privacy protection effectiveness evaluation protocol, algorithm, method, and/or system for intersection-size-revealing protocols. Features in the embodiments disclosed herein adopt a dynamic programming based optimal tree partition approach, enhance and improve the privacy protection and/or privacy protection effective evaluation technology or technical field by, e.g., acknowledging the roles of both positive membership and negative membership during the membership inference process, broadening the scope of data considered, allowing for optimal sub-branch division (instead of a fixed or even division), leveraging a dynamic programming approach for enhanced efficiency, providing a more comprehensive privacy evaluation solution under a limited protocol run times (where existing methods fall short and/or are infeasible to achieve), etc.

In one example embodiment, a method for evaluating privacy protection is provided. The method includes generating a first intersection of a first dataset and a second dataset. The method also includes determining a partition number based on the first dataset, the first intersection, and a number of iterations by: determining a privacy leakage for subsets of the first dataset based on the first dataset, the first intersection, and the number of iterations; and determining the partition number based on the privacy leakage for each of the subsets of the first dataset. The method further includes partitioning the first dataset into a first sub-dataset and a second sub-dataset using the partition number, and determining positive membership and negative membership for elements of the first sub-dataset in the second dataset and for elements of the second sub-dataset in the second dataset.

In another example embodiment, a privacy protection evaluation system is provided. The system includes a processor and a memory to store a first dataset and a number of iterations. The processor is to generate a first intersection of the first dataset and a second dataset. The processor is also to determine a partition number based on the first dataset, the first intersection, and the number of iterations by: determining a privacy leakage for subsets of the first dataset based on the first dataset, the first intersection, and the number of iterations; and determining the partition number based on the privacy leakage for each of the subsets of the first dataset. The processor is further to partition the first dataset into a first sub-dataset and a second sub-dataset using the partition number, and determine positive membership and negative membership for elements of the first sub-dataset in the second dataset and for elements of the second sub-dataset in the second dataset.

In yet another example embodiment, a non-transitory computer-readable medium having computer-executable instructions stored thereon is provided. The instructions, upon execution, cause one or more processors to perform operations including generating a first intersection of a first dataset and a second dataset. The operations also include determining a partition number based on the first dataset, the first intersection, and a number of iterations by: determining a privacy leakage for subsets of the first dataset based on the first dataset, the first intersection, and the number of iterations; and determining the partition number based on the privacy leakage for each of the subsets of the first dataset. The operations further include partitioning the first dataset into a first sub-dataset and a second sub-dataset using the partition number, and determining positive membership and negative membership for elements of the first sub-dataset in the second dataset and for elements of the second sub-dataset in the second dataset.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
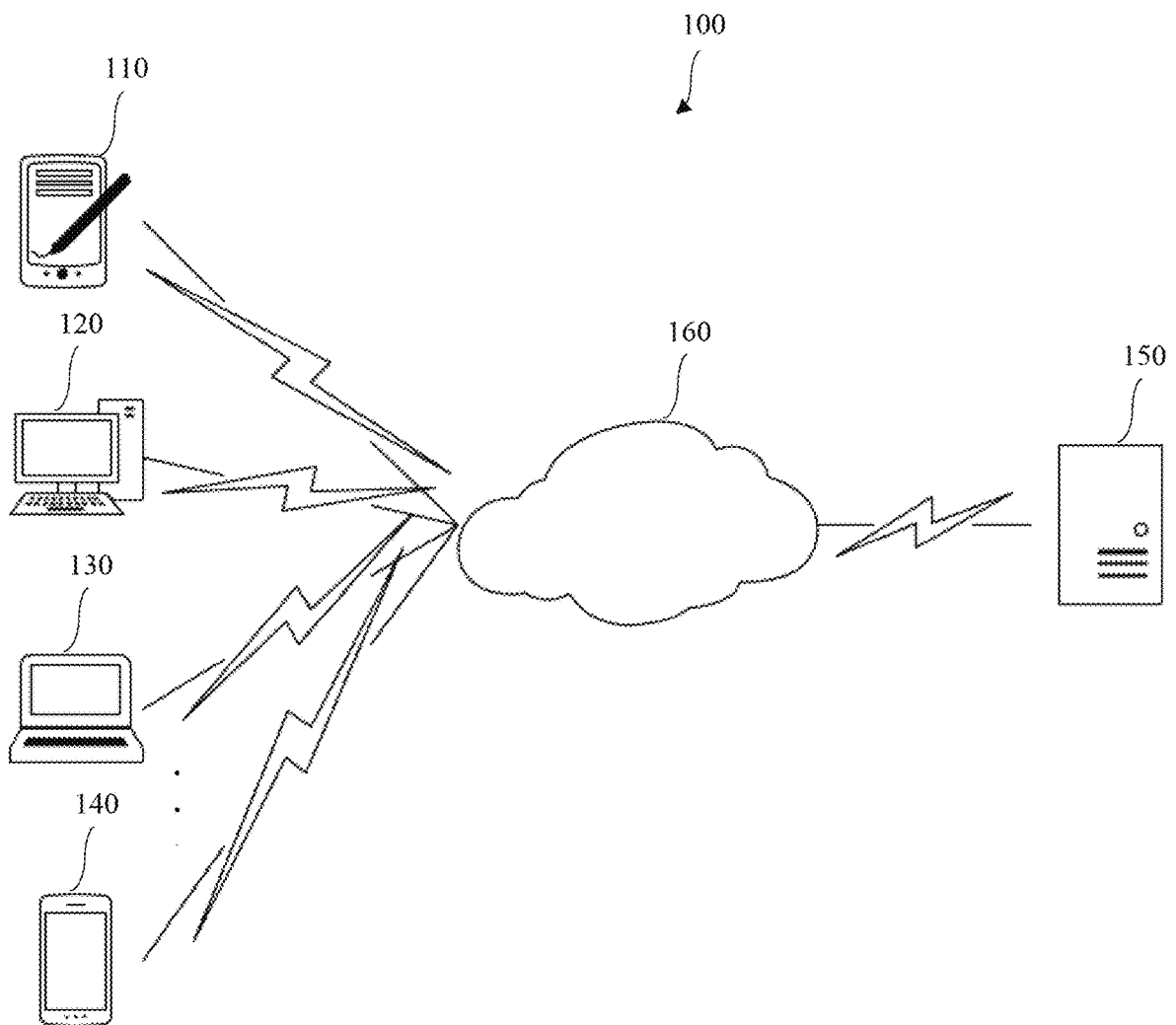
FIG. 1 is a schematic view of an example privacy protection effectiveness evaluation system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, user's unique ID, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art. It is also to be understood that a size, count, or cardinality of a dataset may refer to the number of records (or rows, elements, etc.) of the dataset.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "set intersection" or "intersection" (of two datasets A and B) is a term of art in the set theory and may refer to a dataset containing all elements or records of A that also belong to B or equivalently, all elements or records of B that also belong to A. That is, the intersection (denoted by $A \cap B$) of datasets A and B may refer to a set of all elements or records that are members of both the datasets A and B. For example, x is an element or record of the intersection of datasets A and B if and only if x is both an element (or record) of A and an element (or record) of B. For example, the intersection of the datasets A (e.g., $\{1, 2, 3\}$) and B (e.g., $\{2, 3, 4\}$) is e.g., the dataset $\{2, 3\}$. It is to be understood that a "set intersection" operation or "intersection" operation (e.g., an inner join operation, etc.) may refer to an operation, protocol, or algorithm to obtain, determine, or identify the intersection of two datasets.

As referenced herein, a "positive membership" of an element or record in a dataset (or with respect to the dataset) may refer to a status of an element or record being a member of the dataset. That is, a positive membership of an element or record in a dataset (or with respect to the dataset) may indicate that the element or record belongs to the dataset or is a member of the dataset. As referenced herein, a "negative membership" of an element or record in a dataset (or with respect to the dataset) may refer to a status of an element or record not being a member of the dataset. That is, a negative membership of an element or record in a dataset (or with respect to the dataset) may indicate that the element or record does not belong to the dataset or is not a member of the dataset. In the example that the intersection of the datasets A (e.g., {1, 2, 3}) and B (e.g., {2, 3, 4}) is e.g., the dataset {2, 3}, the elements "1", "2", and "3" have positive membership in or with respect to dataset A, and the element "4" has negative membership in or with respect to dataset A. The elements "2", "3", and "4" have positive membership in or with respect to dataset B, and the element "1" has negative membership in or with respect to dataset B. The elements "2" and "3" of the intersection have positive membership in or with respect to both dataset A and dataset B.

As referenced herein, a "leakage" or "privacy leakage" may refer to a disclosure or revealing of information that is supposed to be protected by e.g., a privacy protection protocol or algorithm. A membership leakage may refer to a disclosure or revealing of the positive membership and/or the negative membership of an element or record in or with respect to a dataset. It is to be understood that the leakage can be quantified using suitable mechanisms. An expected leakage may refer to a quantified leakage based on a probability distribution of the leakage.

As referenced herein, "private set intersection" is a term of art and may refer to a secure multi-party computation cryptographic operation, algorithm, or function by which two or more parties holding respective datasets compare encrypted versions of these datasets in order to compute the intersection. It is to be understood that for private set intersection, neither party reveals data elements to the counterparty except for e.g., the aggregated data of the elements in the intersection.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "dynamic programming" is a term of art and may refer to an optimization method, protocol, and/or algorithm by, e.g., simplifying a complicated problem by breaking it down into simpler sub-problems in a recursive manner. For example, with dynamic programming, a problem can be solved optimally by breaking it into sub-problems and then recursively finding the optimal solutions to the sub-problems (that have optimal substructure). It is to be understood that dynamic programming methods, protocols, and/or algorithms are applicable if sub-problems can be nested recursively inside larger problems, and the value or result or solution of the larger problem can be determined based on the values or results or solutions of the sub-problems. It is also to be understood that in dynamic programming methods, protocols, and/or algorithms, the values or results or solutions of the sub-problems can be saved for future use. That is, the dynamic programming method, protocol, and/or algorithm tries to solve each sub-problem only once, thereby reducing the amount of calculation—once the solution of a given sub-problem has been determined, it is memorized and stored, so that the next time when the solution to the same sub-problem is needed, it can be directly looked up e.g., in a look-up table.

As referenced herein, a "state" is a term of art in dynamic programming and may refer to a sub-problem or a solution of the sub-problem, which may represent the problem for input data which is subset of the whole problem input. A dynamic programming method, protocol, and/or algorithm may be based on a starting state of the problem, and a recurrent relation between the successive states. A state of the problem may represent a sub-solution, e.g., a partial solution or a solution based on a subset of the given input. The states can be built one by one, based on the previously built states. A dynamic programming solution may start with an initial state and then build the succeeding states based on the previously found ones.

FIG. 1 is a schematic view of an example privacy protection effectiveness evaluation system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple instances of server 150 or may be implemented by a single server 150.

A user may use one or more of the terminal devices 110, 120, 130, and 140 to interact with the server 150 via the network 160. Various applications or localized interfaces thereof, such as social media applications, online shopping services, privacy protection effectiveness evaluation applications or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2A:
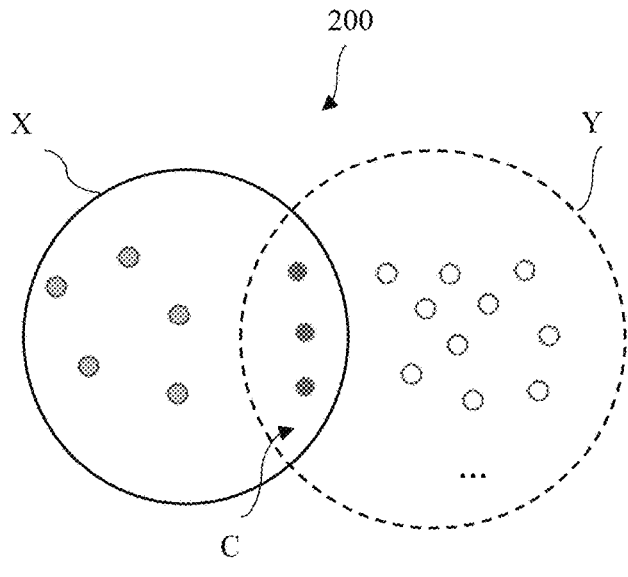
FIG. 2A is a schematic diagram illustrating an example of a set intersection operation, in accordance with at least some embodiments described herein.
Figure 2B:
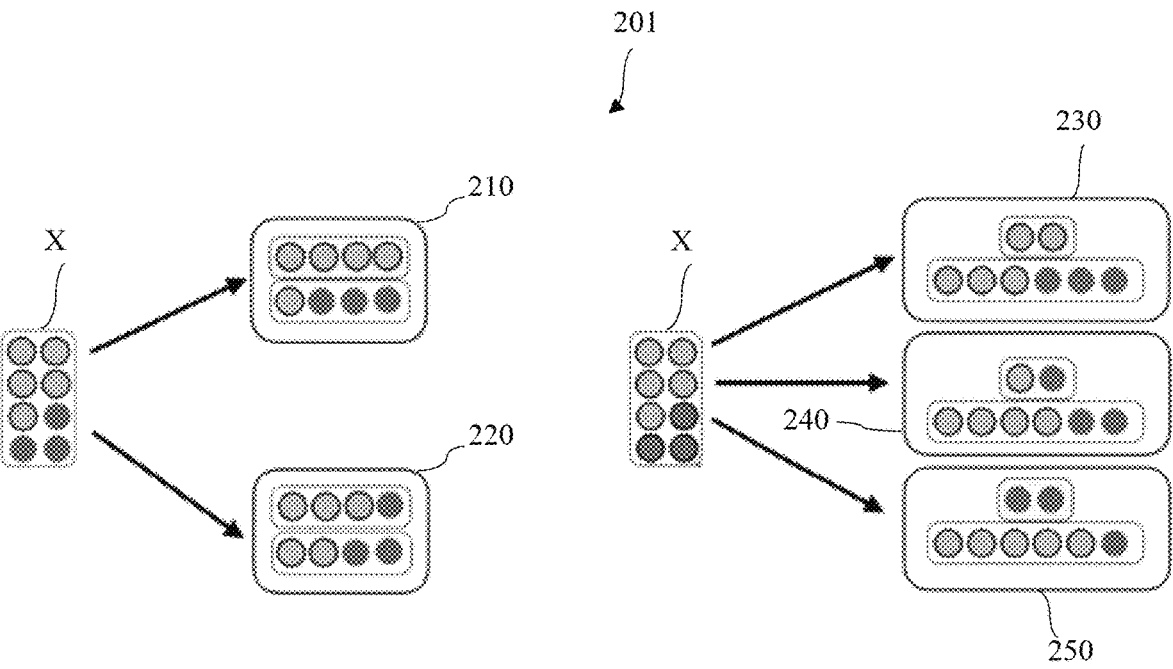
FIG. 2B is a schematic diagram illustrating an example of determining an expected leakage for a state of a dynamic programming protocol or algorithm, in accordance with at least some embodiments described herein.

FIG. 2A is a schematic diagram 200 illustrating an example of a set intersection operation, in accordance with at least some embodiments described herein. FIG. 2B is a schematic diagram 201 illustrating an example of determining an expected leakage for a state of a dynamic programming protocol or algorithm, in accordance with at least some embodiments described herein.

Figure 6:
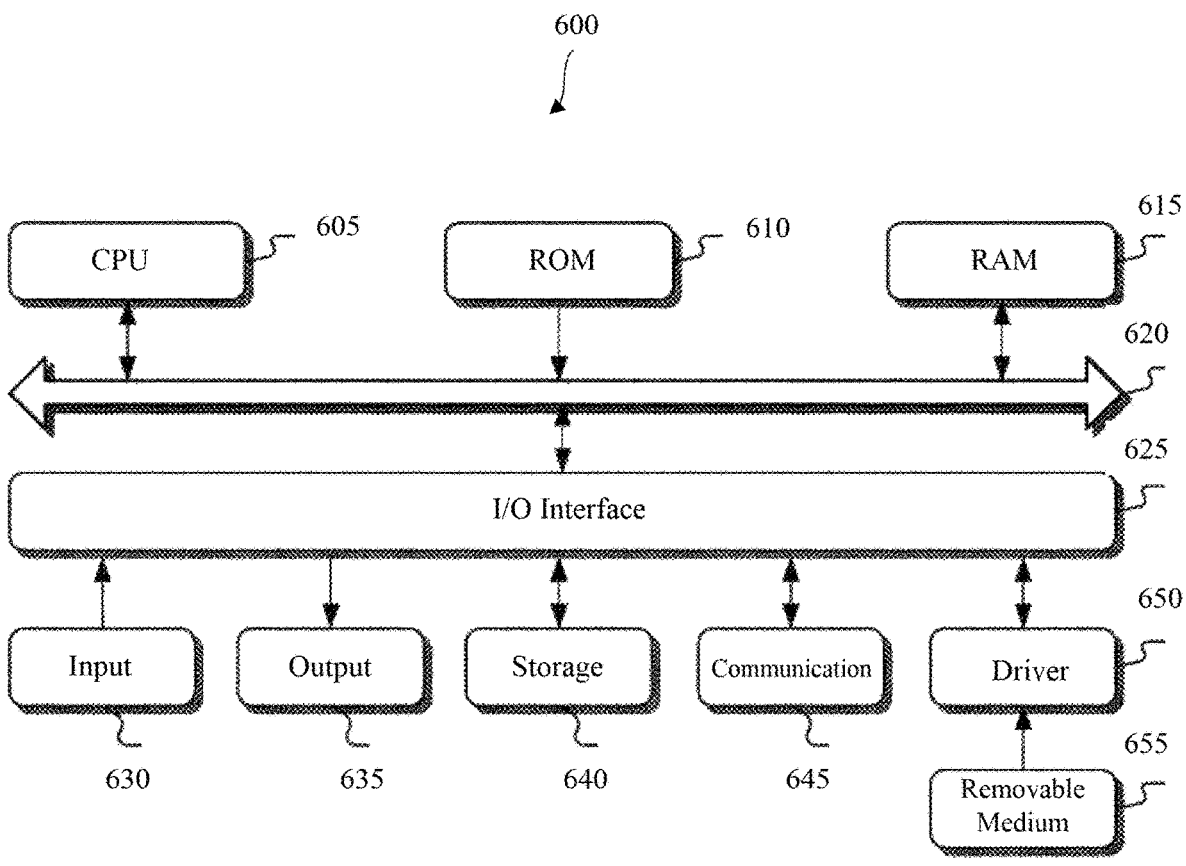
FIG. 6 is a schematic structural diagram of an example computer system applicable to implementing an electronic device, arranged in accordance with at least some embodiments described herein.

It is to be understood that the processing steps of the diagrams 200 and 201 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

As shown in FIG. 2A, Party A has a dataset X and Party B has a dataset Y. It is to be understood that the format, content, and/or arrangement of the datasets described herein are for descriptive purposes only and are not intended to be limiting.

In an example embodiment, the dataset X includes eight elements or records $\{x1, x2, x3, x4, x5, c1, c2, c3\}$. The dataset Y includes three or more elements or records $\{c1, c2, c3, y1, y2, y3, y4, y5 \ldots\}$. A set intersection operation (e.g. a PSI, an MPC based PSI, etc.) of the dataset X and the dataset Y may be performed, and the resultant intersection (a dataset C) of the dataset X and the dataset Y includes three elements $\{c1, c2, c3\}$. It is to be understood that PSI and/or MPC based PSI algorithms or protocols may permit Party A and Party B to jointly compute a function (e.g., count, sum, etc.) over the intersection of datasets X and Y without revealing to either party the intersection explicitly. That is, the set intersection operation of the dataset X and the dataset Y may not reveal the intersection C to either party, but may disclose the size, count, or cardinality ("3" in this example) of the intersection C of the datasets X and Y to one or both parties, via e.g., an intersection-size-revealing protocol or algorithm.

It is to be understood that an intersection operation or a set intersection operation may refer to a fundamental operation that may be performed on large datasets in situations such as MPC based PSI operations, structured query language datasets/databases join operations, contact discovery, etc. It is also to be understood that when an intersection operation requires input datasets from two different data owners and/or parties, both parties may be required to compute the intersection of private datasets without disclosing data and/or user membership within each dataset. Many approaches may safeguard user privacy by permitting two parties to jointly compute a function (e.g., count, sum, average, etc.) over the intersection of their datasets without revealing this underlining intersection data, e.g., keep the set intersection in the ciphertext. It is to be understood that the cardinality of the intersection may be disclosed to one or both parties, via e.g., intersection-size-revealing protocols.

It is also to be understood that the intersection-size-revealing protocols may be subject to set membership inference attacks, i.e., the attacker (or evaluator), as one party of the intersection-size-revealing protocol, may eventually learn membership of any subsets of individuals/users/records from his party by continuously calling the intersection-size-revealing protocol. Membership may refer to a status whether an individual or user is within the dataset of one or the other party. It is further to be understood that attacking or evaluating a privacy protection protocol (such as an intersection-size-revealing protocol) may be used as a way to evaluate the effectiveness of such protocol. In real application, existing attacks may not be efficient enough, as most of dataset owners may only allow running the intersection-size-revealing protocol with their dataset for limited number of times during a fixed time interval. Under a certain (e.g., limited, predetermined, etc.) number of intersection-size-revealing protocol invocations, membership leakage caused by existing attack may be very small or zero, while the true privacy leakage caused by a potential more powerful attacker can be more significant. Features in the embodiments disclosed herein consider both positive membership leakage as well as negative membership information, and provide a more efficient privacy protection effectiveness evaluation method within the number of times limitation of running the intersection-size-revealing protocol.

It is further to be understood that a MPC based PSI operation may include one or more of the following processes: either party (Party A and/or Party B) may shuffle and encode (or encode and shuffle) its corresponding dataset X and/or Y. It is to be understood that shuffle or shuffling is a term of art and may refer to an action or algorithm for randomly rearranging the order of the records (elements, rows, etc.) of e.g., a dataset. Encode or encoding is a term of art and may refer to an action or algorithm e.g., for encrypting the records (elements, rows, etc.) or fields (attributes, columns, etc.) of e.g., a dataset based on e.g., an encryption algorithm or protocol. The parties may exchange their corresponding shuffled and encoded dataset with each other, shuffle and encode (or encode and shuffle) the exchanged dataset. The parties may exchange their corresponding resultant datasets (encoded by Party A and then encoded by Party B, or encoded by Party B and then encoded by Party A) with each other. That is, both Party A and Party B have the dataset X (that is encoded by both Party A and Party B) and the dataset Y (that is encoded by both Party A and Party B), but may not know the content of those datasets since each party may have its own encryption key to encode the dataset. Either or both party may perform an intersection operation based on the dataset X (that is encoded by both Party A and Party B) and the dataset Y (that is encoded by both Party A and Party B) to generate or obtain an intersection. The content of the intersection is unknown to neither party (since each party may have its own encryption key to encode the dataset, which may result in an unknown intersection), but the size, count, or cardinality of the intersection may be known to either or both parties. It is to be understood that the intersection may be used for further processing such as generating secret shares, gathering secret shares, and/or generating the results by combining gathered secret shares, etc. The MPC based PSI operation described above (that returns or reveals the cardinality of the intersection and/or only the cardinality of the intersection) may refer to a PSI-CA (Private Set Intersection-Cardinality) operation.

Referring back to FIG. 2A, a PSI-CA operation may be performed on the dataset X and the dataset Y, and the cardinality of the intersection (and only the cardinality of the intersection) C may be revealed to either or both parties. That is, after a PSI-CA operation between the dataset X and the dataset Y, Party A may know that "3" out of the "8" elements or records (without knowing which "3" elements or records) in the dataset X may have positive membership in or with respect to dataset Y, and "5" out of the "8" elements or records (without knowing which "5" elements or records) in the dataset X may have negative membership in or with respect to dataset Y.

FIG. 2B illustrates an example 201 of determining an expected leakage for a state of a dynamic programming protocol or algorithm, based on the cardinality of the intersection revealed in FIG. 2A.

As described in FIG. 2A and as shown in FIG. 2B, it is known or revealed that the dataset X (of Party A) has 3 elements or records (dark circles) that have positive membership in or with respect to dataset Y (not shown in FIG. 2B), and 5 elements or records (light circles) that have negative membership in or with respect to dataset Y. The current state ("state" is to be described in detail in FIG. 3) of a dynamic programming protocol or algorithm (for evaluating the effectiveness of a privacy protection protocol or an intersection-size-revealing protocol) may be represented as a tuple $(8, 3, \tau)$, where 8 is the number of the size (or count, cardinality, etc.) of the dataset X (represented by "|X|"), 3 is the number of the size of the intersection C (i.e., the number of elements or records in the dataset X that have positive membership in or with respect to dataset Y), and $\tau$ is the remaining number of invocations of the protocol (e.g., the privacy protection protocol or the intersection-size-revealing protocol to be evaluated).

In an example embodiment, to simplify the explanation of the process of determining an expected leakage of the state, assuming $\tau$ is equal to 1, then the current state is $(8, 3, 1)$. The expected leakage of the current state may be represented as the maximum expected leakage of all possible groupings or partitions of sub-datasets based on a partition factor or number K.

For example, the partition factor K may be an integer ranging from 1 to a lower (or upper) bound of $(|X|+1)/2$. When K=1, the dataset X may be partitioned (using the partition factor K) into 1 element and 7 (|X|−K) elements. The 1 element may have a positive membership (in or with respect to dataset Y) or a negative membership (in or with respect to dataset Y), each case (positive or negative membership) may have an expected leakage. The expected leakage of the grouping (1 element and 7 elements) may be determined as a summary of each expected leakage of each case in the grouping.

In an example embodiment, when K=2, the dataset X may be partitioned (using the partition factor K) into 2 elements and 6 (|X|−K) elements. The 2 elements may both have positive membership (in or with respect to dataset Y, see 250 of FIG. 2B), both have negative membership (in or with respect to dataset Y, see 230 of FIG. 2B), or have one positive membership and one negative membership (in or with respect to dataset Y, see 240 of FIG. 2B), each case (230, 240, 250) may have an expected leakage. The expected leakage of the grouping (2 elements and 6 elements) may be determined as a summary of each expected leakage (of 230, 240, 250) of the grouping. Each expected leakage of the cases 230, 240, and 250 can be determined by a possibility distribution of the cases 230, 240, and 250 and their corresponding leakage. For example, for the case 230, the possibility or possibility distribution of the case 230 can be determined based on combination.

It is to be understood that a "combination" is a term of art in mathematics and may refer to a selection of items from a set that has distinct members, such that the order of selection does not matter (unlike permutations). A k-combination of a set n is a subset of k distinct elements of n, denoted by e.g., C(n, k).

Referring back to FIG. 2B, the possibility or possibility distribution of the case 230 can be determined or represented as C(5, 2)/C(8, 2), where C(5, 2) indicates selecting 2 negative members (i.e., elements have negative membership in dataset Y) among all 5 negative members, C(8, 2) indicates selecting 2 members (i.e., elements have either positive or negative membership in dataset Y) among all 8 members. The leakage of the case 230 can be determined or represented as the number of membership (positive or negative) that are known (2 negative membership). That is, the expected leakage of the case 230 is $2 \times C(5, 2)/C(8, 2)=0.714$.

The possibility or possibility distribution of the case 240 can be determined or represented as $(C(5, 1) \times C(3, 1))/C(8, 2)$, where C(5, 1) indicates selecting 1 negative member (i.e., the element having negative membership in the dataset Y) among all 5 negative members, C(3, 1) indicates selecting 1 positive member (i.e., the element having positive membership in the dataset Y) among all 3 positive members, C(8, 2) indicates selecting 2 members (i.e., elements have either positive or negative membership in dataset Y) among all 8 members. The leakage of the case 240 can be determined or represented as the number of membership (positive or negative) that are known (since there is 1 positive member and 1 negative member, the membership therefore cannot be determined for sure, and the leakage number is 0). That is, the expected leakage of the case 230 is $0 \times (C(5, 1) \times C(3, 1))/C(8, 2)=0$.

The possibility or possibility distribution of the case 250 can be determined or represented as C(3, 2)/C(8, 2), where C(3, 2) indicates selecting 2 positive members (i.e., elements have positive membership in dataset Y) among all 3 positive members, C(8, 2) indicates selecting 2 members (i.e., elements have either positive or negative membership in dataset Y) among all 8 members. The leakage of the case 250 can be determined or represented as the number of membership (positive or negative) that are known (2 positive membership). That is, the expected leakage of the case 250 is $2 \times C(3, 2)/C(8, 2)=0.214$.

As such, the expected leakage of the grouping (2 elements and 6 elements) may be determined as a summary of each expected leakage (of 230, 240, 250) of the grouping, which is 0.714+0+0.214=0.928.

Similarly, the possibility or possibility distribution of the case 210 can be determined or represented as C(5, 4)/C(8, 4), where C(5, 4) indicates selecting 4 negative members (i.e., elements have negative membership in dataset Y) among all 5 negative members, C(8, 4) indicates selecting 4 members (i.e., elements have either positive or negative membership in dataset Y) among all 8 members. The leakage of the case 210 can be determined or represented as the number of membership (positive or negative) that are known (4 negative membership). That is, the expected leakage of the case 210 is $4 \times C(5, 4)/C(8, 4)=0.285$.

The possibility or possibility distribution of the case 220 can be determined or represented as $(C(5, 3) \times C(3, 1))/C(8, 4)$, where C(5, 3) indicates selecting 3 negative members among all 5 negative members, C(3, 1) indicates selecting 1 positive member among all 3 positive members, C(8, 4) indicates selecting 4 members (i.e., elements have either positive or negative membership in dataset Y) among all 8 members. The leakage of the case 220 can be determined or represented as the number of membership (positive or negative) that are known (since there is 1 positive member and 3 negative member, the membership therefore cannot be determined for sure, and the leakage number is 0). That is, the expected leakage of the case 230 is $0 \times (C(5, 3) \times C(3, 1))/C(8, 4) = 0$.

As such, the expected leakage of the grouping (4 elements and 4 elements) may be determined as a summary of each expected leakage (of 210, 220) of the grouping, which is $0.285 + 0 = 0.285$.

Similarly, the expected leakage of the grouping (1 element and 7 elements) and the expected leakage of the grouping (3 elements and 5 elements) may be determined based on the description above. The expected leakage of the current state (8, 3, 1) may be represented as the maximum expected leakage (0.928 for grouping 230, 240, and 250) of all possible groupings ((1 and 7), (2 and 6), (3 and 5), (4 and 4)) of sub-datasets, and the optimal partition factor or number K is 2 (for grouping (2 and 6)).

Figure 3:
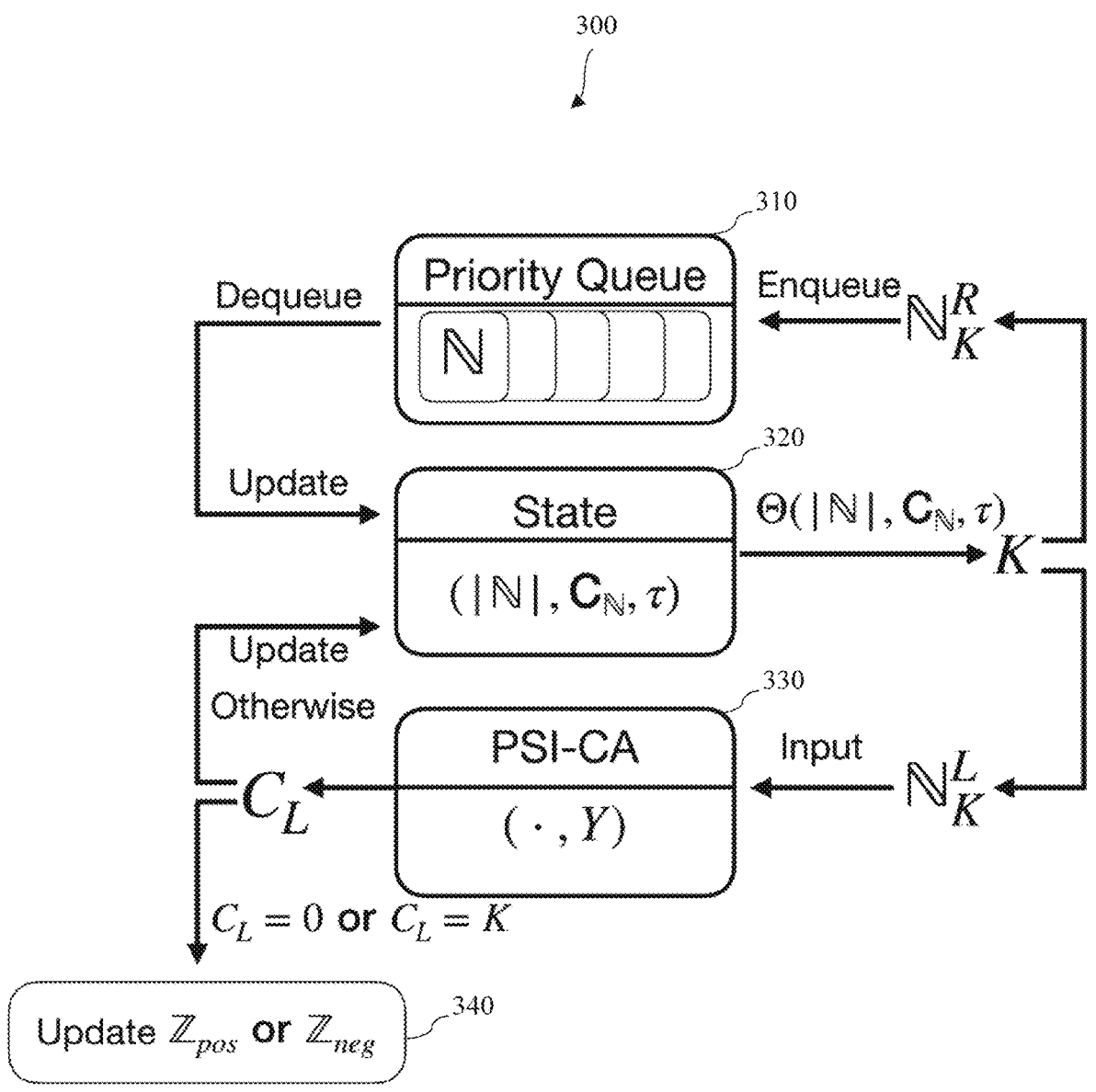
FIG. 3 is a schematic diagram illustrating an example of a privacy protection effectiveness evaluation algorithm, in accordance with at least some embodiments described herein.

It is to be understood that the method, protocol, or algorithm described in FIG. 2B for determining an expected leakage of a state (e.g., current state, etc.) may be used in FIG. 3.

FIG. 3 is a schematic diagram illustrating an example of a privacy protection effectiveness evaluation algorithm 300, in accordance with at least some embodiments described herein.

It is to be understood that the processing steps of the algorithm 300 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

In an example embodiment, Party A has a dataset X (including a plurality of elements, rows or records) and Party B has a dataset Y (including a plurality of elements, rows or records). It is to be understood that the format, content, and/or arrangement of the datasets described herein are for descriptive purposes only and are not intended to be limiting. Party A is the evaluator of the effectiveness of a privacy protection protocol and/or intersection-size-revealing protocol. That is, Party A may try various attack techniques or running algorithms disclosed herein to reveal membership (positive or negative membership) of elements of dataset X in or with respect to dataset Y, as much as possible to evaluate the effectiveness of the privacy protection protocol.

In an example embodiment, the size or count or cardinality of dataset X may be denoted as |X|, the cardinality of dataset Y may be denoted as |Y|. It is to be understood that "cardinality" is a term of art in mathematics and may refer to a measure of a set's size, meaning the number of elements in the set (or rows, records, etc. in a dataset). The cardinality of the intersection between the dataset X and the dataset Y may be denoted as $|X \cap Y|$. In the context of intersection-size-revealing protocols, the party that receives the intersection size (the cardinality of the intersection) obtains a measure of similarity between its own dataset and the other party's dataset. Given that the party has the freedom to select its own dataset for the protocol, the party can strategically assess the other party's dataset according to its interests (e.g., evaluating the effectiveness of the privacy protection protocol, etc.).

In an example embodiment, Party A (the evaluator, the attacker, etc.) may launch the privacy protection evaluation and may participate in running or executing intersectionsize-revealing protocols or algorithms multiple times as a party. During each protocol or algorithm execution, the evaluator (e.g., Party A, etc.) may select its input and obtain the intersection size (the cardinality of the intersection) resulting from its input dataset and Party B's dataset. The evaluator is allowed to repeatedly engage in the privacy protection protocol or algorithm invocations with the same party (e.g., Party B, etc.) under a query budget (e.g., a predefined number of times of running or executing the intersection-size-revealing protocols or algorithms). Party A (the evaluator) may have a set of target elements or records and aim to ascertain their membership status (e.g. positive or negative membership) within Party B's dataset. Based on different applications, the evaluator may be interested in different membership information (e.g. positive or negative membership, etc.). Party A can adaptively design the evaluation strategy to maximize the desired return (e.g., the maximum number of elements' positive or negative membership in Party B's dataset). It is to be understood that the evaluator's effectiveness relies on the ability to repeatedly invoke the protocol with Party B. In practical scenarios, the number of times the protocol can be called (invoked, run, executed, etc.) might be limited due to a constraint (e.g., a predetermined number or budget, etc.). Such constraint may limit the evaluator's ability to perform an exhaustive search and reduce the accuracy of the inferred dataset membership. Features of the embodiments disclosed herein may provide an efficient algorithm (or method, protocol, etc.) for evaluating membership leakage in such dataset intersection operations quantitatively, and/or may maximize the number of revealed membership (positive or negative membership) of elements of dataset X in or with respect to dataset Y as much as possible to evaluate the effectiveness of the privacy protection protocol within such constraint.

Referring back to FIG. 3, which illustrates an example of a privacy protection effectiveness evaluation algorithm 300 using a dynamic programming solution, a state at block 320 is provided. It is to be understood that a "state" is a term of art in dynamic programming and may refer to a number of variables at a particular instant that are required to calculate the optimal result. That is, a state is a combination of variables that may keep changing over different instants. It is to be understood that more the number of states, more is the depth of the recursive solution and more is the memory required to cache the result of the states to avoid re-computing.

In an example embodiment, the state at block 320 may be a tuple including 3 variables: $(|N|, C_N, \tau)$, where N is a dataset derived from the dataset X (e.g., the dataset X, a subset of the dataset X, etc.), |N| is the size or cardinality of the dataset N, $C_N$ is the cardinality of the intersection (i.e., all elements of the intersection have positive membership in dataset Y) between the dataset N and the dataset Y, and $\tau$ is the constraint (the maximum allowable number of invocations of the intersection-size-revealing protocol). It is to be understood that as described in FIG. 2B, different values of the partition factor (or partition number) K may lead to different membership inference scenarios with different expected leakage. For a state $(|N|, C_N, \tau)$, $\Gamma_k(|N|, C_N, \tau)$ may refer to the expected leakage of the state $(|N|, C_N, \tau)$ when the partition factor is k. For the state $(|N|, C_N, \tau)$, the optimal partition factor K, which is an output of a partition rule function $\Theta(|N|, C_N, \tau)$, may be determined as $\text{argmax}_k \Gamma_k(|N|, C_N, \tau)$, which is the partition factor k that leads to the maximum or largest expected leakage (among all possible partition factors). FIG. 2B describes how to determine the expected leakage E for each partition factor k among all possible partition factors. The maximum or largest expected leakage may be denoted as $\Gamma(|N|, C_N, \tau)$, which is $\Gamma_K(|N|, C_N, \tau)$.

In an example embodiment, $\Phi(|N|, C_N)$ is provided to represent the smallest number of expected protocol run (the smallest number of invocations of the intersection-size-revealing protocol) the evaluator needs to infer the membership of the elements of the dataset N, given $C_N$ of the elements have positive memberships. $\Phi(|N|, C_N)$ may be determined as $$\min_{\Gamma(|N|,CN,\tau)\geq N} \tau.$$

In an example embodiment, partitioning the current dataset N using the partition factor K may generate two sub-datasets $N_K^L$ (left child/partition, having K elements) and $N_K^R$ (right child/partition, having $|N|-K$ elements). It is to be understood that the (optimal) partition factor K may lead to the maximum or largest expected leakage (among all possible partition factors) for the state ($|N|$, $C_N$, $\tau$).

It is to be understood that the positive members (i.e., elements having positive membership in the dataset Y) in the first K elements ($N_K^L$), that is, the PSI-CA result of the dataset $N_K^L$ and the dataset Y, can be denoted as a random variable $C_L$, with a probability distribution of $\Pr(C_L=c)=C$ $(C_N, c) \times C(|N-C_N|, K-c)/C(N, K)$, where $C(C_N, c)$ indicates selecting c positive members (i.e., elements have positive membership in dataset Y) among all $C_N$ positive members, $C(|N-C_N|, K-c)$ indicates selecting $K-c$ negative member among all $|N-C_N|$ negative members, $C(N, K)$ indicates selecting K members (i.e., elements have either positive or negative membership in dataset Y) among all N members. As described in FIG. 2B, the expected leakage $E_{CL}$ may be determined based on the positive members (a random variable $C_L$ with the probability distribution), which is also PSI-CA result of the dataset $N_K^L$ and the dataset Y. That is, the expected leakage $E_{CL}$ for the corresponding state can be determined or represented as the number of membership (positive or negative) that are known.

It is also to be understood that the maximum or largest expected leakage $\Gamma_K(|N|, C_N, \tau)$ may be can be derived by recursive function calls. For example, after partitioning using the partition factor K, the total expected leakage by choosing the left child $N_K^L$ becomes $\Gamma_K^L(|N|, C_N, \tau)$, which can be (1) $E_{CL}[\Gamma(K, C_L, \tau-1)]$ if $\Phi(K, C_L) >= \tau-1$, or (2) $K+E_{CL}[\Gamma(|N|-K, C_N-CL, \tau-\Phi(K, C_L))]$ otherwise.

Similarly, the total expected leakage by choosing the right child $N_K^R$ becomes $\Gamma_K^R(|N|, C_N, \tau)$, which can be (1) $E_{CL}[\Gamma(|N|-K, C_N-C_L, \tau-1)]$ if $\Phi(|N|-K, C_N-C_L) >= \tau-1$, or (2) $|N|-K+E_{CL}[\Gamma(K, C_L, \tau-\Phi(|N|-K, C_N-C_L))]$ otherwise.

As such, $\Gamma_K L(|N|, C_N, \tau)$ can be represented as $\max\{\Gamma_K^L(|N|, C_N, \tau), \Gamma_K^R(|N|, C_N, \tau)\}$.

Referring back to FIG. 3, after a first PSI-CA operation (e.g., between the dataset X and the dataset Y, see description of FIG. 2A), the initial state ($|N|$, $C_N$, $\tau$) may be determined, where $|N|$ is the size of the dataset N derived from the dataset X (the initial content of the dataset N may be the content of the dataset X of Party A), $C_N$ is the cardinality of the resultant intersection from the PSI-CA operation, and $\tau$ is the remaining constraint (e.g., the remaining number of times the PSI-CA operation may be invoked).

In an example embodiment, the partition rule function $\Theta(|N|, C_N, \tau)$ may be invoked which outputs the optimal partition factor K. The dataset N is then partitioned into $N_K^L$ and $N_K^R$. It is to be understood that the total expected leakage ($\Gamma_K^L(|N|, C_N, \tau)$) of $N_K^L$ may be determined, and the total expected leakage ($\Gamma_K^R(|N|, C_N, \tau)$) of $N_K^R$ may be determined. Assuming $N_K^L$ has a higher total expected leakage, the child/partition ($N_K^L$) has a higher total expected leakage may be chosen as an input to the next PSI-CA operation at block 330 (e.g., between the dataset $N_K^L$ and the dataset Y). The positive members $C_L$ (i.e., the random variable $C_L$ with the probability distribution) of the child/partition ($N_K^L$) may be determined based on the resultant intersection of the PSI-CA operation at block 330. If $C_L=0$ (no positive members, i.e., all negative members) or $C_L=K$ (all positive members, i.e., no negative members), at block 340, the dataset containing all the positive members Zpos may be updated to include the newly identified positive members, and/or the dataset containing all the negative members Zneg may be updated to include the newly identified negative members.

In an example embodiment, if $C_L$ is not equal to 0 and $C_L$ is not equal to K, the state at block 320 ($|N|$, $C_N$, $\tau$) may be updated to be ($|N_K^L|$, the cardinality of the resultant intersection of $N_K^L$ and Y, $\tau-1$), and the process may continue/repeat from the updated state 320 to e.g., determine the new partition factor K'.

In an example embodiment, the child/partition (e.g., right child/partition $N_K^R$) has a lower total expected leakage may be queued into a priority queue at block 310, where the queue is ordered such that the node in the queue with the highest priority (i.e., the highest total expected leakage) may be de-queued first to update the state at block 320 (as a new state) when the current state has been processed.

In summary, as shown in FIG. 3, the expected leakage of the current state at block 320 may depend on the partition factor K. For a given partition factor K=k, the privacy protection effectiveness evaluation protocol or algorithm described herein may choose from the left or the right child/partition based on their corresponding expected leakage values. The privacy protection evaluation protocol or algorithm may subsequently select the child/partition with the maximum expected leakage value as the new input of the next PSI-CA operation at block 330, relegating the other child/partition into to the priority queue at block 310. Assuming the left child/partition ($N_K^L$) has a larger expected leakage than the right child/partition ($N_K^R$), after partitioning the dataset N into $N_K^L$ and $N_K^R$ using the partition factor K, the privacy protection evaluation protocol or algorithm may invoke the PSI-CA operation at block 330 and receive an observation of the cardinality of the intersection $C_L$. If $C_L=0$, none of the elements in the input dataset $N_K^L$ belongs to the intersection and Zneg is updated as $Zneg \cup N_K^L$. If $C_L=K$, all elements in the input dataset $N_K^L$ belong to the intersection and Zpos is updated as $Zpos \cup N_K^L$. Other than these two cases, the new $C_L$, together with K and $\tau-1$ form a new state (K, $C_L$, $\tau-1$) of the evaluation/attack.

It is to be understood that once the expected leakage for the parent node is determined, all the expected leakage of its child nodes (i.e., the partitions) can be available, as they are the intermediate steps in determining the parent node. That is, to determine $\Gamma(|N|, C_N, \tau)$, all $\Gamma(|N|', C'_N, \tau')$ are required, where $1 <= |N|' <= |N|$, $1 <= C'_N <= C_N$, and $0 < \tau' < \tau$. When the privacy protection effectiveness evaluation protocol or algorithm is proceeding, any observations on the real number of positive memberships in the current node are included. Therefore, the policy space of $\Gamma$ only needs to be determined once offline and can be directly used for further retrieval.

Figure 4:
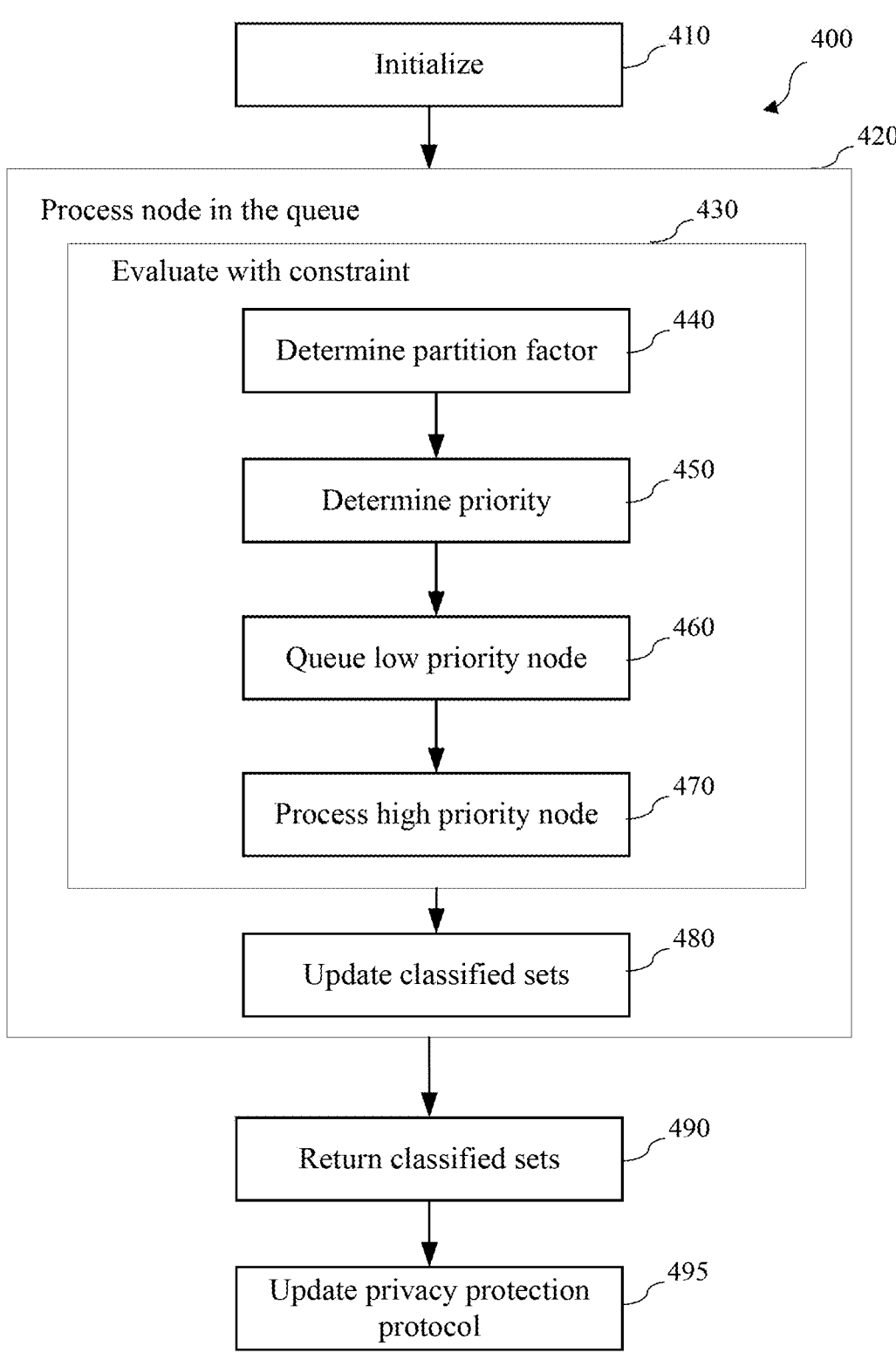
FIG. 4 is a flow chart illustrating an example processing flow for evaluating the effectiveness of a privacy protection protocol, in accordance with at least some embodiments described herein.

FIG. 4 is a flow chart illustrating an example processing flow 400 for evaluating the effectiveness of a privacy protection protocol, in accordance with at least some embodiments described herein. It is to be understood that the processing flow 400 disclosed herein may include one or more processes described in FIGS. 2A, 2B, and 3.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 400 can include one or more operations, actions, or functions as illustrated by one or more of blocks 410, 420, 430, 440, 450, 460, 470, 480, 490, and 495. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized. Processing flow 400 may begin at block 410.

At block 410 (Initialize), the processor may perform or conduct a plurality of initialization processes. In an example embodiment, the processor may receive, obtain, or provide a dataset X (e.g., for the evaluator, Party A) containing target elements or records. The target elements (i.e., the elements in the dataset X) are the elements for which the evaluator tries to identify the membership (e.g., positive or negative membership in the dataset Y of Party B). The processor may also receive, obtain, or provide a predetermined intermediate results $\ominus$ (see the description of FIG. 5) that contains all the intermediate results of optimal partition factors. The processor may further receive, obtain, or provide the constraint T (i.e., the maximum allowable number or remaining number of invocations of the PSI-CA protocol or invocations of the privacy protection protocol to be evaluated). Also the processor may initialize the classified dataset Zpos (that is used to store the identified/classified positive members) as an empty dataset, and initialize the classified dataset Zneg (that is used to store the identified/classified negative members) as an empty dataset. The processor may also conduct, invoke, execute, run, or perform a PSI-CA operation on the dataset X and the dataset Y; obtain, receive, or generate the cardinality of the resultant intersection $C_X$; and decrease the constraint number $\tau$ by 1 ($\tau=\tau-1$). It is to be understood that the cardinality of the intersection $C_X$ may indicate how many positive members the dataset X has. The processor may further add or queue the node $\{(C_X,X)\}$ to a queue (e.g., a priority queue, etc.). Processing may proceed from block 410 to block 420.

At block 420 (Process node in the queue), the processor may perform a loop (e.g., a "while" loop) until the queue (e.g., a priority queue, etc.) is empty. The processor may de-queue the highest priority node (i.e., the node with the highest expect leakage) as current node ($C_N$, N), and process such node at block 430. Processing may proceed from block 420 to block 430.

At block 430 (Evaluate with constraint), the processor may perform a loop (e.g., a "while" loop) until (1) the condition $0<C_N<|N|$ is not met or (2) the condition $\tau>0$ is not met. That is, the loop may end either the membership (positive or negative membership) of all the elements in the dataset N are identified as positive ($C_N=|N|$) or negative ($C_N=0$), or the constraint number limit is reached (that is, the number $\tau$ is decreased by 1 each time a PSI-CA operation is invoked, and $\tau$ is decreased down to 0).

Within block 430, the first processing step is block 440. At block 440 (Determine partition factor), the processor may receive, obtain, or generate an output (the partition factor K) from the partition rule function $\ominus$ (i.e., $\ominus(|N|, C_N, \tau)$) for the current state ($|N|, C_N, \tau$). See the description of FIG. 5. The processor may partition the dataset N (using the partition factor K) into two sub-datasets $N_K^L$ (having K elements) and $N_K^R$ (having $|N|-K$ elements). Processing may proceed from block 440 to block 450.

At block 450 (Determine priority), the processor may conduct, invoke, execute, run, or perform a PSI-CA operation on the dataset $N_K^L$ and the dataset Y; obtain, receive, or generate the cardinality of the resultant intersection $C_L$; and decrease the constraint number $\tau$ by 1 ($\tau=\tau-1$). It is to be understood that the cardinality of the intersection $C_L$ may indicate how many positive members the dataset $N_K^L$ has. The number of positive member for $N_K^R$ ($C_R$) may be represented as $C_N-C_L$. The processor may also determine the priority (i.e., the expected leakage) of the two sub-datasets $N_K^L$ and $N_K^R$ (see the description of FIG. 3 regarding how to determine the expected leakage for the two sub-datasets). Processing may proceed from block 450 to block 460.

At block 460 (Queue low priority node), the processor may queue the node (e.g., $(C_R,N_K^R)$) having a lower priority (see description of block 450, assuming the right child/partition has a lower priority) into a queue (e.g., a priority queue). Processing may proceed from block 460 to block 470.

At block 470 (Process high priority node), the processor may process the node (e.g., $(C_L,N_K^L)$) having a higher priority (see description of block 450, assuming the left child/partition has a higher priority) by e.g., setting the higher priority node as the current node ($C_L$, N) for processing. Processing may proceed from block 470 to the start of block 430 until the loop of the block 430 ends. Processing may then proceed from block 470 or 430 to block 480.

At block 480 (Update classified sets), the processor may update the classified datasets Zneg and Zpos by: if $C_N=0$, none of the elements in the input dataset N belongs to the intersection, and Zneg is updated as Zneg$\cup$N; if $C_N=|N|$, all elements in the input dataset N belong to the intersection, and Zpos is updated as Zpos$\cup$N. Processing may proceed from block 480 to the start of block 420 until the loop of the block 420 ends. Processing may then proceed from block 480 or 420 to block 490.

At block 490 (Return classified sets), the processor may return the classified datasets Zneg and Zpos as output of the privacy protection protocol evaluation algorithm. The processor may also evaluate the effectiveness of the privacy protection protocol (e.g., the PSI-CA protocol) by measuring the number of positive numbers in the dataset Zpos and/or the number of negative numbers in the dataset Zneg. More numbers in Zneg and/or Zpos, given a same constraint (e.g., the number of maximum allowed number of invocation of the privacy protection protocol to be evaluated), less effective the privacy protection protocol (to be evaluated) may be. Processing may proceed from block 490 to block 495.

At block 495 (Update privacy protection protocol), the processor may improve the privacy protection protocol to be evaluated by at least one of (1) adding noise(s) to the dataset Y, (2) reduce the maximum allowable number ($\tau$) of invocations of the privacy protection protocol to be evaluated, (3) add noise(s) to intersection results when a PSI-CA operation is performed between a dataset and the dataset Y, etc., based on the evaluation of the privacy protection protocol (e.g., the PSI-CA protocol).

Figure 5:
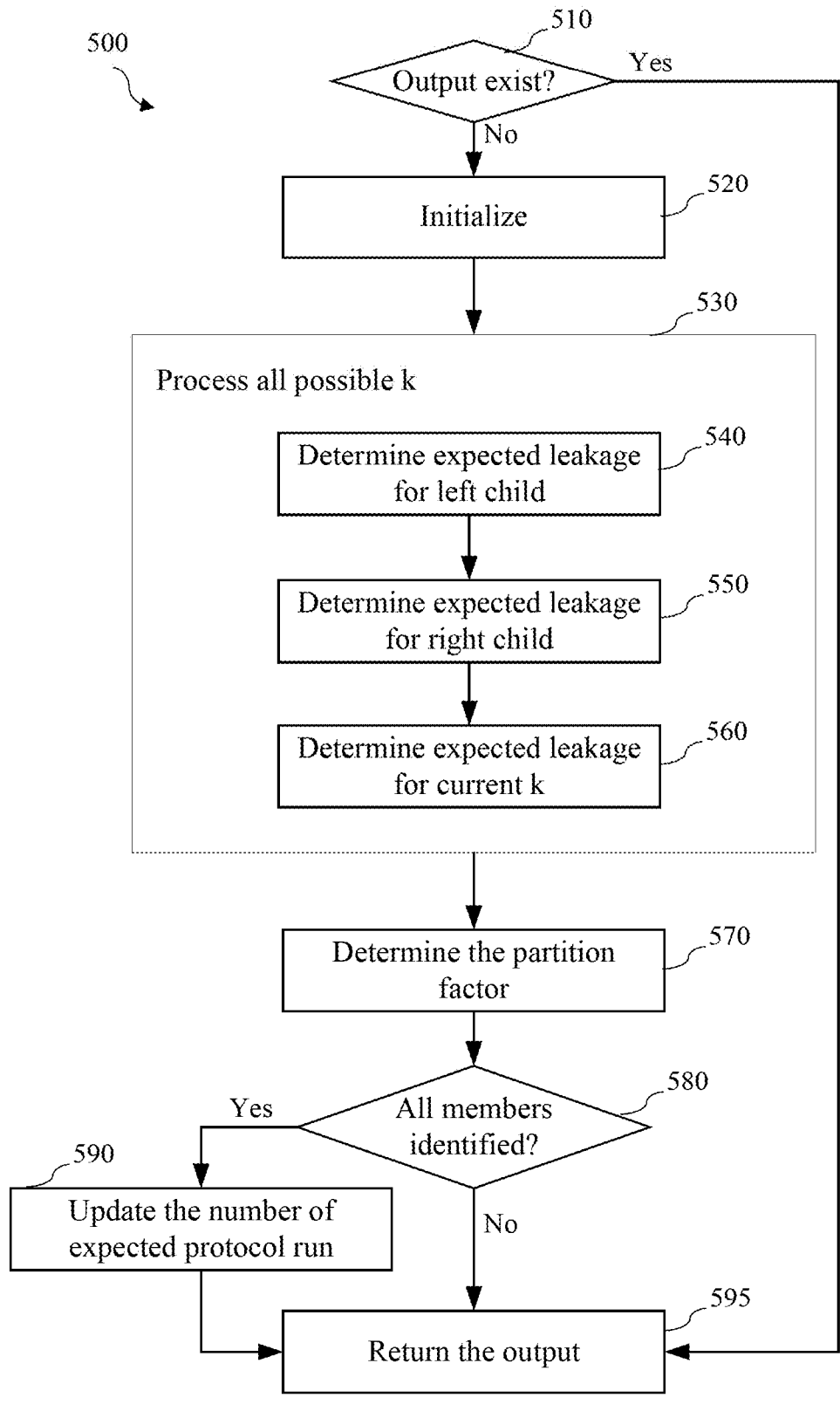
FIG. 5 is a flow chart illustrating an example processing flow for determining the partition factor, in accordance with at least some embodiments described herein.

FIG. 5 is a flow chart illustrating an example processing flow 500 for determining the partition factor, in accordance with at least some embodiments described herein. It is to be understood that the processing flow 500 disclosed herein may include one or more processes described in FIGS. 2B and 3. It is also to be understood that the processing flow 500 disclosed herein may provide a protocol or algorithm for generating intermediate variables (e.g., partition factors, etc.) with a dynamic programming approach.

It is to be understood that the processing flow 500 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 500 can include one or more operations, actions, or functions as illustrated by one or more of blocks 510, 520, 530, 540, 550, 560, 570, 580, 590, and 595. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation.

It is to be understood that before the processing flow 500, operations including initializations or the like may be performed. For example, system parameters and/or application parameters may be initialized. In an example embodiment, a memorized space for the variables $\Gamma$ and $\Phi$ may be created or generated. $\Gamma(|N|, C_N, \tau)$ may refer to the maximum or largest expected leakage of (the groupings of) the state $(|N|, C_N, \tau)$. $\Phi(|N|, C_N)$ is provided to represent the smallest number of expected protocol run (the smallest number of invocations of the intersection-size-revealing protocol) the evaluator needs to infer the membership of the elements of the dataset N, given $C_N$ of the elements have positive memberships. In an example embodiment, the variables $\Gamma$ and $\Phi$ may be initialized as e.g., hash tables (or other suitable data structure), where the key of $\Gamma$ is $(|N|, C_N, \tau)$, and the key of $\Phi$ is $(|N|, C_N)$. The value of $\Gamma(1, 1, 0)$ is 1, indicating that the value of the expected leakage of the state $(1, 1, 0)$ is 1, where the state indicates 1 member in the dataset N, 1 positive member in the intersection of the dataset N and the dataset Y, and the remaining PSI-CA protocol invocation time/number is 0. The value of $\Gamma(1, 0, 0)$ is 1, indicating that the value of the expected leakage of the state $(1, 0, 0)$ is 1, where the state indicates 1 member in the dataset N, 0 positive member (or 1 negative member since $|N|$ is 1) in the intersection of the dataset N and the dataset Y, and the remaining PSI-CA protocol invocation times/number is 0. The value of $\Phi(1, 1)$ is 0, indicating that there is 1 member in the dataset N, and 1 positive member in the intersection (of the dataset N and the dataset Y), there is no need to run the PSI-CA protocol and thus the smallest number of expected PSI-CA protocol run is 0. The value of $\Phi(1, 0)$ is 1, indicating that there is 1 member in the dataset N, and 0 positive member in the intersection (of the dataset N and the dataset Y), and thus the smallest number of expected PSI-CA protocol run is 1 (that the evaluator needs to run to infer the membership of the elements of the dataset N).

After the initialization of system parameters and/or application parameters, processing flow 500 may begin at block 510. It is to be understood that the processor for the processing flow 500 may obtain, receive, or accept the following inputs: the size $(|N|)$ of the dataset N (which is derived from the dataset X of Party A), memberships $(C_N)$ of the elements in the intersection (of the dataset N and the dataset Y of Party B), and the constraint $\tau$ (the number of remaining invocations of the PSI-CA protocol or the privacy protection protocol to be evaluated). The processing flow 500 may be an optimal tree partition algorithm based on dynamic programming.

At block 510 (Output exist?), the processor may check whether the output (i.e., the optimal partition factor) of the partition rule function $\Theta(|N|, C_N, \tau)$ already exists (e.g., in the memory or a storage). If the output exists, processing may proceed from block 510 to block 595. If the output does not exist, processing may proceed from block 510 to block 520.

At block 520 (Initialize), the processor may initiate the expected leakage $\Gamma(|N|, C_N, \tau)$ of the state $(|N|, C_N, \tau)$ to 0 (no expected leakage initially), the value or output of the partition rule function $\Theta(|N|, C_N, \tau)$ to 0 (the partition factor is 0 indicating no partition initially), and the smallest number of expected protocol run (the smallest number of invocations of the intersection-size-revealing protocol) $\Phi(N|, C_N)$ to $|N|$ (if for each element in the dataset N, a PSI-CA protocol is performed to determine its membership). Processing may proceed from block 520 to block 530.

At block 530 (Process all possible k), the processor may perform a loop (e.g., a "for" loop) conditioned on all the possible k until the all the possible k is processed. The condition can be "$1<=k<=(|N|+1)/2$", indicating the integer k starts from 1 to the lower bound (or upper bound) of $(|N|+1)/2$.

Within block 530, the first processing step is block 540. At block 540 (Determine expected leakage for left child), the processor may partition the dataset N using the current partition factor k, into a left child/partition $N_k^L$ and a right child/partition $N_k^R$. The processor may also determine the total expected leakage of the left child $\Gamma_k^L(|N|, C_N, \tau)$, which can be (1) $E_{CL}[\Gamma(k, C_L, \tau-1)]$ if $\Phi(k, C_L)>=\tau-1$, or (2) $k+E_{CL}[\Gamma(|N|-k, C_N-C_L, \tau-\Phi(k, C_L))]$ otherwise. See the description of FIG. 3. Processing may proceed from block 540 to block 550.

At block 550 (Determine expected leakage for right child), the processor may determine the total expected leakage of the right child $\Gamma_k^R(|N|, C_N, \tau)$, which can be (1) $E_{CL}[\Gamma(|N|-k, C_N-C_L, \tau-1)]$ if $(|N|-k, C_N-C_L)>=\tau-1$, or (2) $|N|-k+E_{CL}[\Gamma(k, C_L, \tau-\Phi(|N|-k, C_N-C_L))]$ otherwise. See the description of FIG. 3. Processing may proceed from block 550 to block 560.

At block 560 (Determine expected leakage for current k), the processor may determine the maximum or largest expected leakage (for current k for the dataset N) $\Gamma(|N|, C_N, \tau-1)$ as $\max\{\Gamma_k^L(|N|, C_N, \tau), \Gamma_k^R(|N|, C_N, \tau-1)\}$. Processing may proceed from block 560 to the start of block 530 until the loop of the block 530 ends. Processing may then proceed from block 560 or 530 to block 570.

At block 570 (Determine the partition factor), the processor may, for the state $(|N|, C_N, \tau)$, determine the optimal partition factor K, which is an output of the partition rule function $\Theta(|N|, C_N, \tau))$, as $\text{argmax}_k \Gamma_k(|N|, C_N, \tau)$, which is the partition factor k that leads to the maximum or largest expected leakage (among all possible partition factors). Processing may proceed from block 570 to block 580.

At block 580 (All members identified?), the processor may check whether all members (positive or negative membership) in the dataset N are identified by, e.g., checking whether the condition "$\Gamma(|N|, C_N, \tau) >= |N|$" is satisfied/met/true. If the condition is evaluated as true, processing may proceed from block 580 to block 590. If the condition is evaluated as false, processing may proceed from block 580 to block 595.

At block 590 (Update the number of expected protocol run), the processor may update the number of expected protocol run by e.g., setting the smallest number of expected protocol run (the smallest number of invocations of the intersection-size-revealing protocol) $\Phi(|N|, C_N)$ to the minimum value of $\Phi(|N|, C_N)$ and $\tau$ (i.e., $\min\{\Phi(|N|, C_N, \tau)\}$). Processing may proceed from block 590 to block 595.

At block 595 (Return the output), the processor may output the optimal partition factor K of the partition rule function $\Theta(|N|, C_N, \tau)$ based on the input state $(|N|, C_N, \tau)$.

It is to be understood that features in the embodiments disclosed herein may quantify the set (or dataset) privacy leakage (such as membership privacy leakage, etc.) for intersection-size-revealing protocols (e.g., PSI-CA, etc.). Features in the embodiments disclosed herein may also capitalize on both positive and negative membership elements, augmenting the membership measurement efficiency substantially. Features in the embodiments disclosed herein may further provide an asymmetrical division (e.g., a dynamical division, a non-fixed division, etc.) of a tree structure during the evaluation/attack process, which may boost the overall effectiveness. It is to be understood that a fixed division or a symmetrical division is to always partition or divide a node into fixed or symmetrical division (e.g., each child/partition has a same number of elements), while an asymmetrical division or a dynamical division is to partition or divide the node based on e.g., a partition factor that leads to e.g., maximum expected leakage. Also, features in the embodiments disclosed herein may provide an optimal tree partition solution which is strategically determined by employing dynamic programming in the processing.

FIG. 6 is a schematic structural diagram of an example computer system 600 applicable to implementing an electronic device (for example, the server or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIGS. 4 and 5 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semi-conductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for evaluating privacy protection, the method comprising: generating a first intersection of a first dataset and a second dataset; determining a partition number based on the first dataset, the first intersection, and a number of iterations by: determining a privacy leakage for subsets of the first dataset based on the first dataset, the first intersection, and the number of iterations, and determining the partition number based on the privacy leakage for each of the subsets of the first dataset; partitioning the first dataset into a first sub-dataset and a second sub-dataset using the partition number; and determining positive membership and negative membership for elements of the first sub-dataset in the second dataset and for elements of the second sub-dataset in the second dataset.

Aspect 2. The method of aspect 1, further comprising: evaluating a privacy protection protocol based on a number of positive membership and a number of negative membership for elements of the first dataset in the second dataset.

Aspect 3. The method of aspect 1 or aspect 2, wherein the determining of positive membership and negative membership for elements of the first sub-dataset in the second dataset and for elements of the second sub-dataset in the second dataset includes: determining a priority level for each of the first sub-dataset and the second sub-dataset; queuing the first sub-dataset or the second sub-dataset having a lower priority level; and determining positive membership and negative membership for elements of the first sub-dataset or the second sub-dataset having a higher priority level.

Aspect 4. The method of aspect 3, further comprising: de-queuing the first sub-dataset or the second sub-dataset having the lower priority level; and determining positive membership and negative membership for elements of the first sub-dataset or the second sub-dataset having the lower priority level.

Aspect 5. The method of aspect 3 or aspect 4, wherein the determining of the priority level for each of the first sub-dataset and the second sub-dataset includes: determining a privacy leakage for each of the first sub-dataset and the second sub-dataset, wherein the priority level for each of the first sub-dataset and the second sub-dataset is determined based on the privacy leakage for each of the first sub-dataset and the second sub-dataset.

Aspect 6. The method of any one of aspects 1-5, wherein the generating of the first intersection includes: decreasing the number of iterations; and updating a state for the first dataset, wherein the state includes a size of the first intersection and the number of iterations.

Aspect 7. The method of any one of aspects 1-6, further comprising: generating a second intersection of the first sub-dataset and the second dataset; decreasing the number of iterations; and updating a state for each of the first sub-dataset and the second sub-dataset, wherein the state includes a size of the second intersection and the number of iterations.

Aspect 8. A privacy protection evaluation system, the system comprising: a memory to store a first dataset and a number of iterations; a processor to: generate a first intersection of the first dataset and a second dataset; determine a partition number based on the first dataset, the first intersection, and the number of iterations by: determining a privacy leakage for subsets of the first dataset based on the first dataset, the first intersection, and the number of iterations, and determining the partition number based on the privacy leakage for each of the subsets of the first dataset; partition the first dataset into a first sub-dataset and a second sub-dataset using the partition number; and determine positive membership and negative membership for elements of the first sub-dataset in the second dataset and for elements of the second sub-dataset in the second dataset.

Aspect 9. The system of aspect 8, wherein the processor is to further: evaluate a privacy protection protocol based on a number of positive membership and a number of negative membership for elements of the first dataset in the second dataset.

Aspect 10. The system of aspect 8 or aspect 9, wherein the processor is to further: determine a priority level for each of the first sub-dataset and the second sub-dataset; queue the first sub-dataset or the second sub-dataset having a lower priority level; and determine positive membership and negative membership for elements of the first sub-dataset or the second sub-dataset having a higher priority level.

Aspect 11. The system of aspect 10, wherein the processor is to further: de-queue the first sub-dataset or the second sub-dataset having the lower priority level; and determine positive membership and negative membership for elements of the first sub-dataset or the second sub-dataset having the lower priority level.

Aspect 12. The system of aspect 10 or aspect 11, wherein the processor is to further: determine a privacy leakage for each of the first sub-dataset and the second sub-dataset, wherein the priority level for each of the first sub-dataset and the second sub-dataset is determined based on the privacy leakage for each of the first sub-dataset and the second sub-dataset.

Aspect 13. The system of any one of aspects 8-12, wherein the processor is to further: decrease the number of iterations; and update a state for the first dataset, wherein the state includes a size of the first intersection and the number of iterations.

Aspect 14. The system of any one of aspects 8-13, wherein the processor is to further: generate a second intersection of the first sub-dataset and the second dataset; decrease the number of iterations; and update a state for each of the first sub-dataset and the second sub-dataset, wherein the state includes a size of the second intersection and the number of iterations.

Aspect 15. A non-transitory computer-readable medium having computer-executable instructions stored thereon that, upon execution, cause one or more processors to perform operations comprising: generating a first intersection of a first dataset and a second dataset; determining a partition number based on the first dataset, the first intersection, and a number of iterations by: determining a privacy leakage for subsets of the first dataset based on the first dataset, the first intersection, and the number of iterations, and determining the partition number based on the privacy leakage for each of the subsets of the first dataset; partitioning the first dataset into a first sub-dataset and a second sub-dataset using the partition number; and determining positive membership and negative membership for elements of the first sub-dataset in the second dataset and for elements of the second sub-dataset in the second dataset.

Aspect 16. The computer-readable medium of aspect 15, wherein the operations further comprise: evaluating a privacy protection protocol based on a number of positive membership and a number of negative membership for elements of the first dataset in the second dataset.

Aspect 17. The computer-readable medium of aspect 15 or aspect 16, wherein the determining of positive membership and negative membership for elements of the first sub-dataset in the second dataset and for elements of the second sub-dataset in the second dataset includes: determining a priority level for each of the first sub-dataset and the second sub-dataset; queuing the first sub-dataset or the second sub-dataset having a lower priority level; and determining positive membership and negative membership for elements of the first sub-dataset or the second sub-dataset having a higher priority level.

Aspect 18. The computer-readable medium of aspect 17, wherein the operations further comprise: de-queuing the first sub-dataset or the second sub-dataset having the lower priority level; and determining positive membership and negative membership for elements of the first sub-dataset or the second sub-dataset having the lower priority level.

Aspect 19. The computer-readable medium of aspect 17 or aspect 18, wherein the determining of the priority level for each of the first sub-dataset and the second sub-dataset includes: determining a privacy leakage for each of the first sub-dataset and the second sub-dataset, wherein the priority level for each of the first sub-dataset and the second sub-dataset is determined based on the privacy leakage for each of the first sub-dataset and the second sub-dataset.

Aspect 20. The computer-readable medium of any one of aspects 15-19, wherein the generating of the first intersection includes: decreasing the number of iterations; and updating a state for the first dataset, wherein the state includes a size of the first intersection and the number of iterations.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for evaluating privacy protection within a system of two or more devices, the method comprising:
   obtaining, over a communication channel between a first device and a second device of the system, (i) a first encrypted data set and (ii) a second encrypted data set, wherein both the first encrypted data set and the second encrypted data set are encoded using an encryption process of each of (i) the first device and (ii) the second device;
   generating a first intersection of the first encrypted data set and the second encrypted data set;
   determining a partition number based on the first encrypted data set, the first intersection, and a number of iterations by:
      determining a privacy leakage for subsets of the first encrypted data set based on the first encrypted data set, the first intersection, and the number of iterations, and
      determining the partition number based on the privacy leakage for each of the subsets of the first encrypted data set;
   partitioning the first encrypted data set into a first sub-dataset and a second sub-dataset using the partition number; and
   determining positive membership and negative membership for elements of the first sub-dataset in the second encrypted data set and for elements of the second sub-dataset in the second encrypted data set.

2. The method of claim 1, further comprising:
   evaluating a privacy protection protocol based on a number of positive membership and a number of negative membership for elements of the first encrypted data set in the second encrypted data set.

3. The method of claim 1, wherein the determining of positive membership and negative membership for elements of the first sub-dataset in the second encrypted data set and for elements of the second sub-dataset in the second encrypted data set includes:

determining a priority level for each of the first sub-dataset and the second sub-dataset;

queuing the first sub-dataset or the second sub-dataset having a lower priority level; and determining positive membership and negative membership for elements of the first sub-dataset or the second sub-dataset having a higher priority level.

4. The method of claim 3, further comprising:

de-queuing the first sub-dataset or the second sub-dataset having the lower priority level; and determining positive membership and negative membership for elements of the first sub-dataset or the second sub-dataset having the lower priority level.

5. The method of claim 3, wherein the determining of the priority level for each of the first sub-dataset and the second sub-dataset includes:

determining a privacy leakage for each of the first sub-dataset and the second sub-dataset, wherein the priority level for each of the first sub-dataset and the second sub-dataset is determined based on the privacy leakage for each of the first sub-dataset and the second sub-dataset.

6. The method of claim 1, wherein the generating of the first intersection includes:

decreasing the number of iterations; and updating a state for the first encrypted data set, wherein the state includes a size of the first intersection and the number of iterations.

7. The method of claim 1, further comprising:

generating a second intersection of the first sub-dataset and the second encrypted data set;

decreasing the number of iterations; and updating a state for each of the first sub-dataset and the second sub-dataset, wherein the state includes a size of the second intersection and the number of iterations.

8. A system for evaluating privacy protection for two or more devices, comprising:

a memory to store a first encrypted data set and a number of iterations;

a processor to:

obtain, over a communication channel between a first device and a second device of the system, (i) a first encrypted data set and (ii) a second encrypted data set, wherein both the first encrypted data set and the second encrypted data set are encoded using an encryption process of each of (i) the first device and (ii) the second device;

generate a first intersection of the first encrypted data set and a second encrypted data set;

determine a partition number based on the first encrypted data set, the first intersection, and the number of iterations by:

determining a privacy leakage for subsets of the first encrypted data set based on the first encrypted data set, the first intersection, and the number of iterations, and determining the partition number based on the privacy leakage for each of the subsets of the first encrypted data set;

partition the first encrypted data set into a first sub-dataset and a second sub-dataset using the partition number; and determine positive membership and negative membership for elements of the first sub-dataset in the second encrypted data set and for elements of the second sub-dataset in the second encrypted data set.

9. The system of claim 8, wherein the processor is to further:

evaluate a privacy protection protocol based on a number of positive membership and a number of negative membership for elements of the first encrypted data set in the second encrypted data set.

10. The system of claim 8, wherein the processor is to further:

determine a priority level for each of the first sub-dataset and the second sub-dataset;

queue the first sub-dataset or the second sub-dataset having a lower priority level; and determine positive membership and negative membership for elements of the first sub-dataset or the second sub-dataset having a higher priority level.

11. The system of claim 10, wherein the processor is to further:

de-queue the first sub-dataset or the second sub-dataset having the lower priority level; and determine positive membership and negative membership for elements of the first sub-dataset or the second sub-dataset having the lower priority level.

12. The system of claim 10, wherein the processor is to further:

determine a privacy leakage for each of the first sub-dataset and the second sub-dataset, wherein the priority level for each of the first sub-dataset and the second sub-dataset is determined based on the privacy leakage for each of the first sub-dataset and the second sub-dataset.

13. The system of claim 8, wherein the processor is to further:

decrease the number of iterations; and update a state for the first encrypted data set, wherein the state includes a size of the first intersection and the number of iterations.

14. The system of claim 8, wherein the processor is to further:

generate a second intersection of the first sub-dataset and the second encrypted data set;

decrease the number of iterations; and update a state for each of the first sub-dataset and the second sub-dataset, wherein the state includes a size of the second intersection and the number of iterations.

15. A non-transitory computer-readable medium having computer-executable instructions stored thereon that, upon execution, cause one or more processors to perform operations for evaluating privacy protection within a system of two or more devices, comprising:

obtaining, over a communication channel between a first device and a second device of the system, (i) a first encrypted data set and (ii) a second encrypted data set, wherein both the first encrypted data set and the second encrypted data set are encoded using an encryption process of each of (i) the first device and (ii) the second device;

generating a first intersection of a first encrypted data set and a second encrypted data set;

determining a partition number based on the first encrypted data set, the first intersection, and a number of iterations by:

determining a privacy leakage for subsets of the first encrypted data set based on the first encrypted data set, the first intersection, and the number of iterations, and determining the partition number based on the privacy leakage for each of the subsets of the first encrypted data set;

partitioning the first encrypted data set into a first sub-dataset and a second sub-dataset using the partition number; and determining positive membership and negative membership for elements of the first sub-dataset in the second encrypted data set and for elements of the second sub-dataset in the second encrypted data set.

16. The non-transitory computer-readable medium of claim 15, wherein the operations further comprise:

evaluating a privacy protection protocol based on a number of positive membership and a number of negative membership for elements of the first encrypted data set in the second encrypted data set.

17. The non-transitory computer-readable medium of claim 15, wherein the determining of positive membership and negative membership for elements of the first sub-dataset in the second encrypted data set and for elements of the second sub-dataset in the second encrypted data set includes:

determining a priority level for each of the first sub-dataset and the second sub-dataset;

queuing the first sub-dataset or the second sub-dataset having a lower priority level; and determining positive membership and negative membership for elements of the first sub-dataset or the second sub-dataset having a higher priority level.

18. The non-transitory computer-readable medium of claim 17, wherein the operations further comprise:

de-queuing the first sub-dataset or the second sub-dataset having the lower priority level; and determining positive membership and negative membership for elements of the first sub-dataset or the second sub-dataset having the lower priority level.

19. The non-transitory computer-readable medium of claim 17, wherein the determining of the priority level for each of the first sub-dataset and the second sub-dataset includes:

determining a privacy leakage for each of the first sub-dataset and the second sub-dataset, wherein the priority level for each of the first sub-dataset and the second sub-dataset is determined based on the privacy leakage for each of the first sub-dataset and the second sub-dataset.

20. The non-transitory computer-readable medium of claim 15, wherein the generating of the first intersection includes:

decreasing the number of iterations; and updating a state for the first encrypted data set, wherein the state includes a size of the first intersection and the number of iterations.

* * * * *